United States Patent

[11] 3,617,644

[72] Inventor John F. Boag
Billericay, England

[21] Appl. No. 743,124
[22] Filed July 8, 1968
[45] Patented Nov. 2, 1971
[73] Assignee The Communications Satellite Corporation

[54] SATELLITE COMMUNICATION EXCHANGE STATION
12 Claims, 6 Drawing Figs.

[52] U.S. Cl. .......... 179/41 A, 325/55, 325/64
[51] Int. Cl. .......... H04q 7/04
[50] Field of Search .......... 179/41 A; 325/4, 55, 64, 57; 343/177, 179, 180

[56] References Cited

UNITED STATES PATENTS

| | | | |
|---|---|---|---|
| 2,061,699 | 11/1936 | Fox | 325/57 |
| 3,376,509 | 4/1968 | Willcox et al. | 325/57 |
| 1,754,881 | 4/1930 | Clement | 325/55 |
| 2,469,555 | 5/1949 | Hitchcock | 179/41 X |
| 2,751,436 | 6/1956 | Bakker | 179/27 |
| 3,110,773 | 11/1963 | Miller | 325/4 |
| 3,193,623 | 7/1965 | Burns et al. | 179/41 |

*Primary Examiner*—Kathleen H. Claffy
*Assistant Examiner*—Jan S. Black
*Attorney*—Sughrue, Rothwell, Mion, Zinn & Macpeak

ABSTRACT: Communication paths between a plurality of earth stations on a demand assignment basis are provided. Each participating station transmits a carrier that is received by all other stations and identifies the transmitting station. A remote station is called by transmitting the remote station calling frequency or address via the local carrier. The remote station then detects its address frequency on the local station carrier and automatically locks onto the channel carrying signals received from the local station. The remote station then transmits the signal frequency or address of the local station via the remote station carrier. When the address is received at the local station, it automatically locks onto the channel carrying signals received from the remote station, thereby providing a communication circuit (two-way communication path) between the calling and the called stations. Each participating station sends out a busy signal during the entire time it is in use. The busy signal from any one station is received by all other stations and prevents the calling of a busy station.

FIG. I
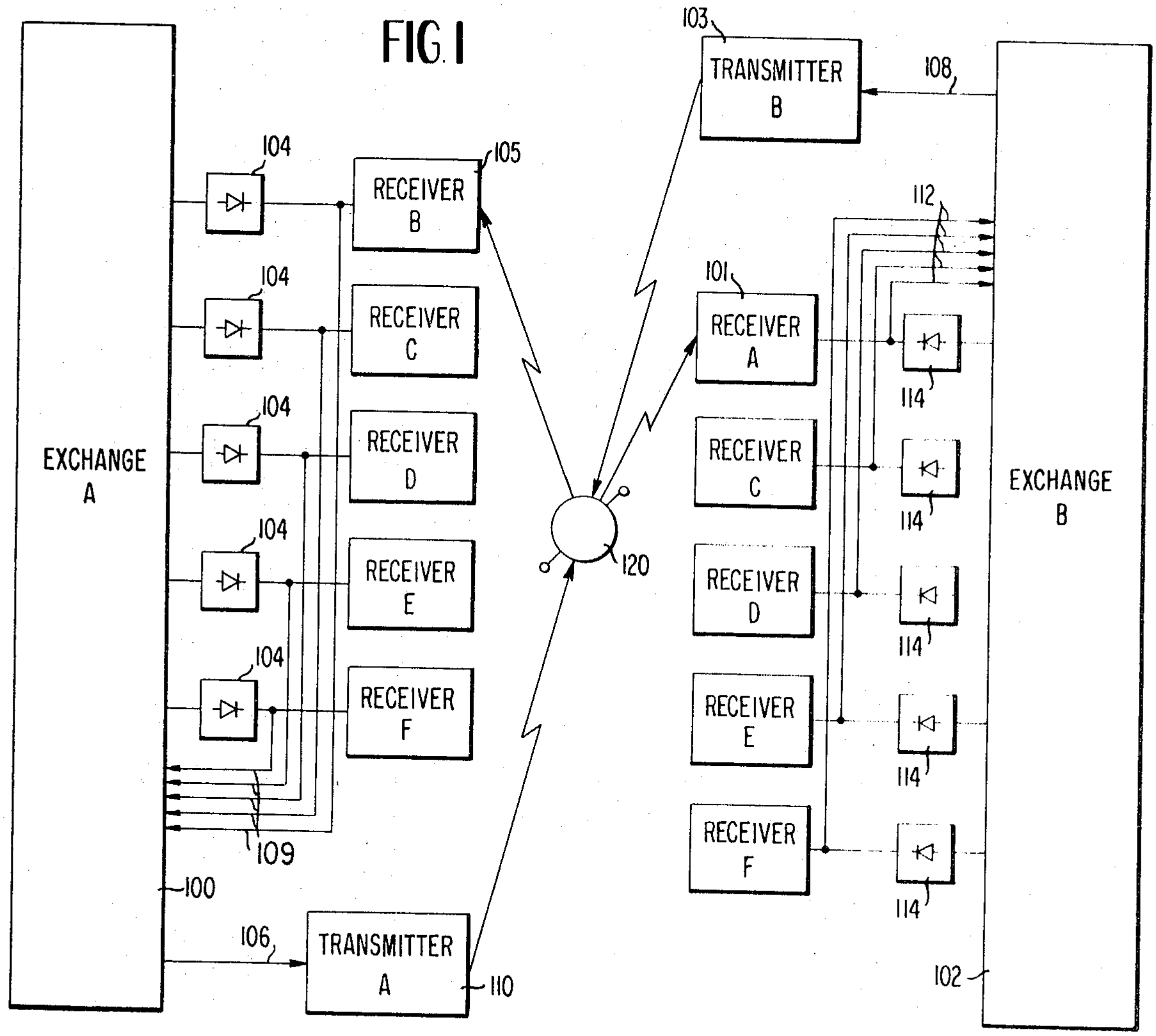
FIG. 4
STANDARD CORD CIRCUIT
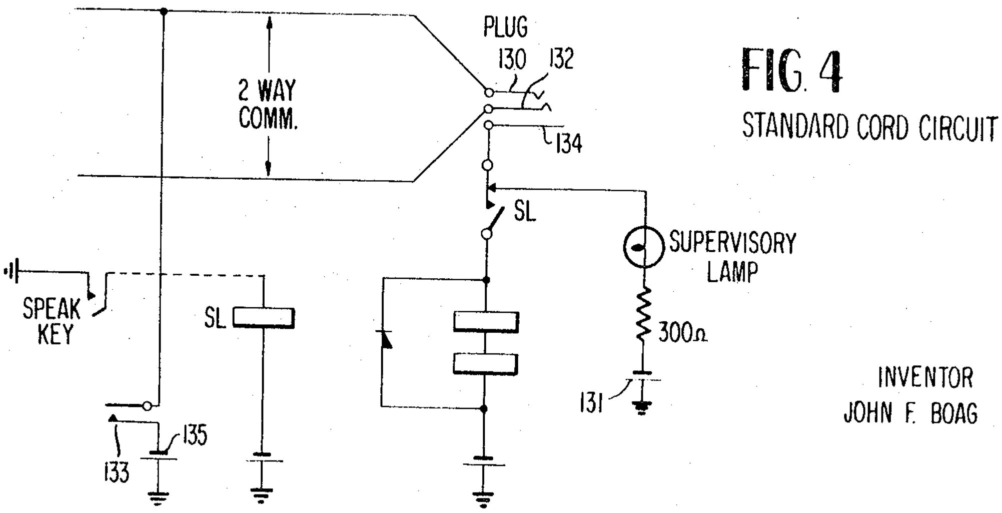
INVENTOR
JOHN F. BOAG
BY *Sughrue, Rothwell, Mion, Zinn & Macpeak*
ATTORNEYS

INVENTOR
JOHN F. BOAG

BY Sughrue, Rothwell, Mion, Zinn & Macpeak
ATTORNEYS

SATELLITE COMMUNICATION EXCHANGE STATION

BACKGROUND OF THE INVENTION

In earth-to-earth communication systems a satellite relay full-time access between a plurality of exchanges at various locations requires a separate communication circuit between each pair of exchanges, e.g., separate "go" and "return" carriers between every pair of stations, thus, a pool of six participating exchanges requires 15 circuits. Areas in which the number of call-minutes per day for a satellite communications exchange is expected to be small can be satisfactorily serviced at significant cost reduction by providing a pool of exchanges which operate on a demand assignment basis. The number of circuits which then becomes necessary for a group of six participating exchanges is reduced to six. Although the cost of savings is great, the service will not be comparable since the actual service provided by the demand assignment arrangement is not the same as that provided between exchanges which are connected by full-time dedicated circuits. However, by restricting the traffic routes to those locations having a low number of call-minutes, and, where possible, choosing exchanges so as to give a maximum spread of traffic with time, reasonable service between exchanges forming the pool can be obtained. An increase in the number of simultaneous connections can be obtained by providing a second pool using the same group of exchanges.

SUMMARY OF THE INVENTION

The exchange of the present invention operates with a plurality of other similar exchanges, forming a pool, to provide demand assignment interconnections between any two of the exchange locations. The invention is designed primarily for use in a satellite communication system wherein the communication path is via a satellite relay. Each participating exchange has one carrier frequency and one signalling frequency or address allocated to it. An exchange is called by sending the address of the called exchange via the carrier of the calling exchange. Each exchange is adapted to receive all of the carriers in the pool and includes an equal number of incoming channels for carrying the communications transmitted on the different carriers. The called station locks onto the incoming channel which receives the called station address thereby providing locked-in reception for communications transmitted by the calling station. Thus, a half circuit of one-way communications link is provided between the calling and called exchanges. In order to provide the other half circuit, the called station automatically transmits the calling station address via the called station carrier, the latter being received by the calling station which operates in the manner described above the lock onto the channel carrying signals from the called station. The result is that a communication circuit, which cannot be interrupted by a third party call is provided between two exchanges in the pool. During the time in which the circuit interconnection is provided between a pair of exchanges they cannot communicate with any other exchanges in the pool.

Each exchange, when in operation, transmits a busy signal via its carrier which is received by all of the other exchanges. The busy signal is preferably an out-of-voice band frequency and, therefore, is transmitted for the duration of a call without interfering with the voice communications. The received busy signals not only notify the operator at an exchange that another exchange is busy, but also prevent the initiation of a call to a busy exchange. Due to the long transmission path distance between exchange locations in a satellite communication system a significant time difference exists between the transmission of a signal by one exchange and its receipt by another exchange. Thus, it is possible for exchange A to call exchange B at a time when exchange B is not busy and have exchange B become busy prior to the time that the signal from exchange A reaches exchange B. In order to stop the call from exchange A and to prevent other problems resulting from the relatively long transmission time, switching means are provided in each exchange for maintaining the busy detecting circuitry operative for a predetermined time following the initiation of a call. The predetermined amount of time is preferably equal to the average transmission time between exchanges.

Preferred addressing frequencies for a pool of six exchanges are: 2,000 Hz., 2,280 Hz., 2,400 Hz., 2,600 Hz., 2,800 Hz., and 3,000 Hz. A preferred out-of-band busy signal for all exchanges in the pool is 3,825 Hz.

There are three stages in setting up a call between exchanges designed in accordance with the present invention. The first stage consists of calling the wanted exchange and at the same time transmitting a busy signal which is received by all other exchanges. A second stage consists of answering the call and associating the "go" and "return" channels at the wanted exchange and sending back a call signal to the calling exchange. A busy signal is also transmitted by the called exchange. The third stage consists of associating the return channel at the calling exchange on receipt of the call signal from the wanted exchange. Some of the advantages of the mode of selection is that it prevents accidental overhearing between exchanges and simplifies the problem associated with dual seizure and ensures that the principle of first-come-first-serve is maintained.

The association of a "go" and "return" channel to form a circuit is carried out automatically. The time required to carry out this operation includes twice the transmission time of a satellite link (approximately 600 ms.) plus switching time (approximately 200 ms.). Since it is feasible that during the time it takes to carry out the automatic switching sequences, signals due to dual seizures could occur and cause switching errors, circuit arrangements are provided to exclude the possibility of errors due to these causes. The two kinds of errors which are excluded by this circuitry are, two exchanges attempting to call one another within the one-way transmission time (approximately 300 ms.) and two exchanges attempting to call a third exchange within the two-way transmission time (approximately 600 ms.).

BRIEF DESCRIPTION OF THE DRAWINGS

FIG. 1 illustrates the transmission and reception of signals between two exchanges of the present invention via a satellite relay.

FIG. 4 is a switching diagram of a standard prior art cord circuit which is used in conjunction with the exchange of the present invention.

DETAILED DESCRIPTION OF THE DRAWINGS

Figure 2:
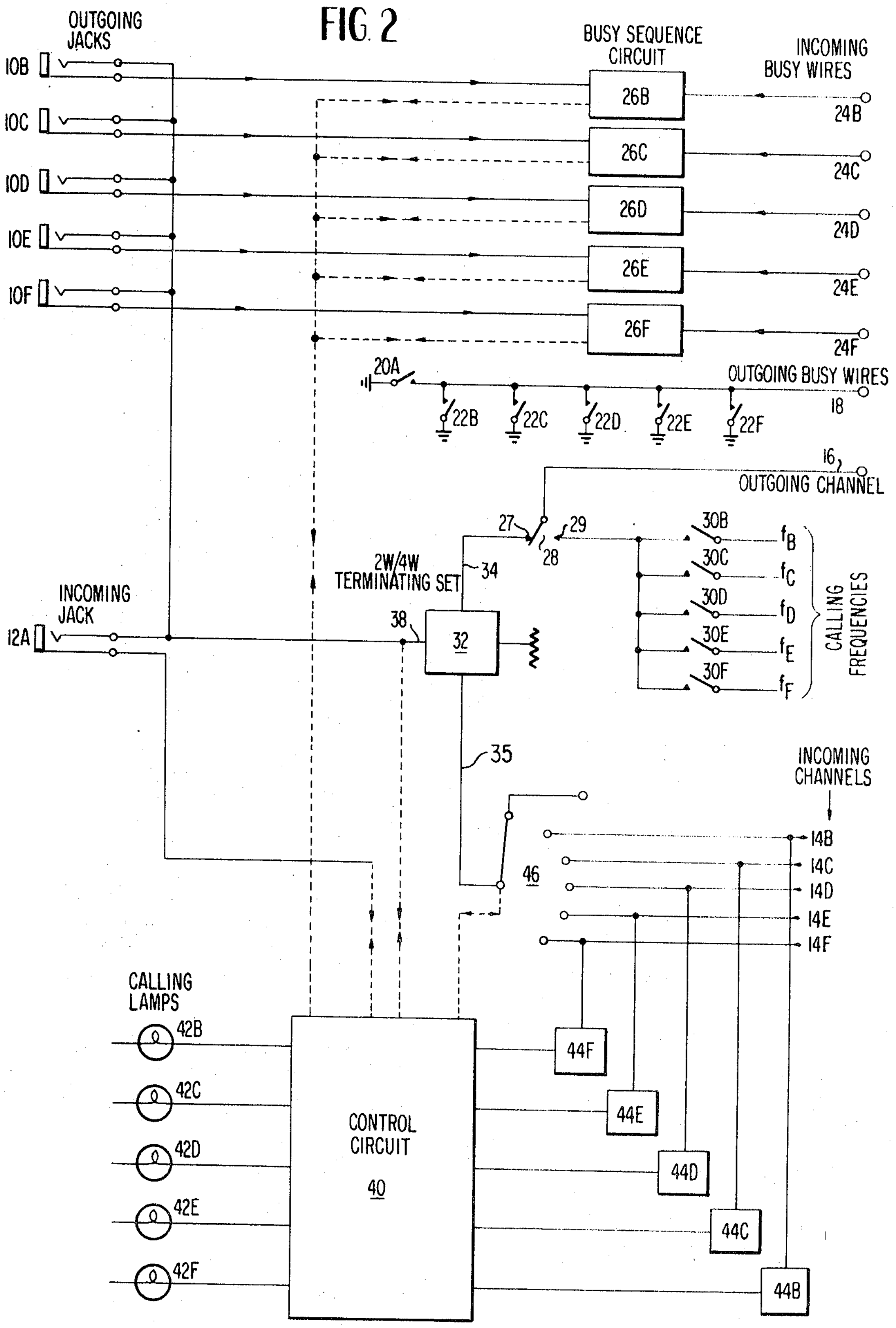
FIG. 2 is a partial block diagram illustrating generally the functions performed by the exchange of the present invention.

Throughout the detailed description of the present invention, it will be assumed for the purposes of explanation only, that a pool of exchanges for operating on a demand assignment basis includes six widely separated exchanges, lettered A through F, wherein exchange A is referred to as the local exchange and exchanges B through F are referred to as the remote exchanges. Although all exchanges are identical to exchange A, with the exception of the carrier transmitted and received, only the details of exchange A will be described herein.

FIG. 1 shows the transmission paths between exchanges A and B at widely separated locations. Each exchange is adapted to operate in conjunction with a ground station receiver transmitter unit that has at least the capabilities of receiving all of the carrier frequencies from the other exchanges and transmitting a unique carrier frequency. The ground station, of course, may have additional capabilities for other various purposes. If exchange A calls exchange B a special calling frequency that identifies exchange B and a busy signal, are sent from exchange A via lead line 106, hereinafter referred to as an outgoing channel, to the transmitter 110 wherein they modulate the exchange A carrier frequency. The output from transmitter 110 is transmitted towards satellite relay 120. The signals relayed by satellite 120 are received by receiver 101 of the exchange B location. The receiver 101 represents the part of the overall receiver for exchange B which is capable of receiving the signal from exchange A. By demodulation in the receiver 101, the carrier is removed and the output therefrom is the exchange B calling frequency and the busy signal. The busy signal is detected by a detector 114 in the receiver 101 output circuitry and is sent to a busying circuit in exchange B which establishes the information condition that exchange A is busy. Note that all other exchanges also detect the busy signal in the same manner. The calling frequency is applied to exchange B via a leadline 112, hereinafter referred to as an incoming channel in the output of receiver 101. The latter frequency is detected in exchange B and thereby notifies exchange B that it is being called by exchange A.

Exchange B responds by sending an exchange A calling frequency and a busy signal via leadline 108, hereinafter referred to as an outgoing channel, to the transmitter 103. The signals on outgoing channel 108 are modulated onto the exchange B carrier frequency, and the output from the transmitter is relayed via satellite 120 to all of the other exchanges in the pool. Receiver 105 in exchange A picks up the signals from exchange B and provides the calling frequency and the busy signal at its output. The busy signal is detected by detector 104 and applied to exchange A, and the calling frequency is applied to exchange A via leadline 108, hereinafter referred to as an incoming channel. Although not shown in FIG. 1, it will be apparent to anyone of ordinary skill in the art that the signals to be transmitted are first translated up to the receive satellite frequency range prior to transmission. In the satellite the signals are translated to the transmit satellite frequency range and transmitted to all ground stations. At the ground stations all signals received from the satellite are translated down to the receiver ranges and then applied to the receivers illustrated, each of which is sensitive to a different carrier frequency.

FIG. 2 shows a functional diagram of a preferred embodiment of the exchange of the present invention. According to the convention used in the drawing, solid lines represent the path of signalling or communications and broken lines represent the control linkages. The exchange is equipped to provide communication with five other similar exchanges referred to as exchanges B through F. The control circuit 40 represents all of the control apparatus, including relays, switches, etc., which control the functioning of the different parts of the exchange.

On the line side of the exchange, that is, the side for connection to the other exchanges, there is a single outgoing channel 16 and five incoming channels 14B through 14F. The latter incoming channels carry signalling frequencies and voice communication from the respective exchanges B through F. On the exchange side of the apparatus, there are five outgoing jacks 10B through 10F and a single incoming jack 12A. As is well known in the telephone switching art, an outgoing call is initiated by inserting the plug of a standard cord circuit into the proper outgoing jack, and an incoming call is accepted by inserting the plug into the incoming jack.

The initiation of a call from exchange A, shown in the drawing, to a similar exchange B, at a remote location, is as follows: On the exchange side, the operator inserts the plug from the cord circuit into outgoing jack 10B. In response thereto, control circuit 40 closes switch 22B and switch 30B. Switch 22B remains closed the entire length of the call and operates to close the circuit of a busy tone generator which provides an out-of-band frequency that is modulated onto the exchange A carrier frequency at the transmitter. Since the busy signal is an out-of-band frequency, it can be transmitted during the entire call without interfering with the speech frequencies.

When switch 30B is closed, the exchange B address $F_B$ is connected to one of the stationary terminals of switch 28. When the operator depresses the ring call key on the standard cord circuit (not shown in FIG. 2), the arm of switch 28 connects address frequency $F_B$ to the outgoing channel 16. In a radio communication system, all signals on outgoing channel 16 will be modulated onto the exchange A carrier frequency. Depression of the ring call key thus serves to transmit a calling frequency to exchange B. When a ring call key is released, the cord circuit via outgoing jack B is connected to the outgoing channel 16 via a two-wire to four-wire terminating set 32. The converter of terminating set 32 has a single input-output connection 38 on the exchange side and a pair of connections 34 and 35 on the line side. Connection 34 is the outgoing connection and connection 35 is the incoming connection.

Since the other exchanges are substantially identical with exchange A, they will be transmitting the out-of-band busy signals on their carriers if they are busy. The busy signals from the respective remote exchanges are received on incoming busy wires 24B through 24F. For a radio communications network, the busy signals are detected by detectors and demodulators in the output circuits of the receivers. The busy signals are applied respectively to busy sequence circuits 26B through 26F, which, in turn, are controlled and provide controls to the control circuit 40. If a busy signal is on line 24B at the time the operator inserts the plug into outgoing jack 10B, the busy sequence circuit operates to send a busy tone to the operator and disconnect the outgoing jack from the terminating set 32. Thus, there will be no call to exchange B and the operator will know that exchange B is busy.

Since the exchange is specifically designed for the purpose of long-distance communication via a satellite relay, the time delay between exchanges is long enough to cause a possible problem if not compensated for in the system. In accordance with the present invention, timing means are provided in each busy sequence circuit to stop the call from station A to a remote station if the remote station is calling station A and has initiated its call first. If the remote station B initiates the call substantially far in advance of the initiation of a call to station B, then immediately upon inserting the plug into outgoing jack B the operator knows that station B is busy and there will be no communications link between the outgoing jack 10B and the terminating set 32. However, the problem occurs when station B initiates a call to station A first and station A initiates a call to station B prior to the time that the signal from B reaches station A. Since the location of the exchanges in the system are known for any operational unit, the average time for radio communications to travel from one exchange to another exchange is known. This time is used as a delay in each of the busy sequence circuits to disable the busy sequence circuit. Specifically, when the operator at station A initiates a call by inserting a plug into outgoing jack 10B, a timing circuit is energized. After a time equal to the one-way transmission time between exchanges, the busy sequence circuit at A is disabled. Thus, if station B initiated a call first, the station B busy signal will be received on wire 24B prior to the time that the busy sequence circuit 26B is disabled, resulting in a cutoff of the attempted call from station A to station B. The busy sequence circuits also include means for stopping the call a predetermined time after initiation it for some reason there is no return from the called exchange.

When exchange B receives the address $F_B$ modulated on the station A carrier frequency, it responds by transmitting the station A address $F_A$ on the station B carrier frequency. In a radio communication system, the incoming channels 14B through 14F may be the demodulated outputs of the receivers, one receiver being used for each of the remote exchanges in the system. One of the incoming channels may be connected to the input connection 35 of the terminating set 32 via a hunting switch apparatus 46. The hunting switch apparatus 46 is in a rest position when there is no call in process.

When the response of exchange B reaches exchange A, it will arrive on incoming channel 14B and the exchange A address, $F_A$, will be detected by detector 44B. Detector 44B indicates to control circuit 40 that a response from exchange B has been received, and control circuit 40 operates hunting switch 46 to connect the incoming connection 35 of terminating set 32 to the incoming channel 14B. Thus, a complete circuit is formed for communicating between stations A and B. Once the hunting switch apparatus 46 hunts for and selects an incoming channel, the control circuit 40 maintains the switch in that position until the call is completed. If a call is received from another exchange prior to the time that a response is received from exchange B, the hunting switch apparatus 46 will lock on the call from the other exchange, thereby giving the caller first priority. As will be pointed out hereafter, means may be provided in the exchange for ensuring that a call from another remote station will not take precedence unless that call was initiated first.

The above describes generally how an exchange initiates a call and receives the response to its call to form a complete communications circuit between the calling and the called exchanges. The process which takes place at the called station is as follows: Assuming that exchange B is calling exchange A, the address $F_A$ will appear on incoming channel 14B and will be detected by detector 44B. In response thereto, control circuit 40 operates calling lamp 42B and also operates the hunting switch apparatus 46 to cause it to connect incoming channel 14B to the terminating set 32. The operator seeing the calling lamp light up inserts the plug of the cord circuit into incoming jack 12A causing switch 20A to close resulting in the transmission of a busy signal to all of the other exchanges. The control circuit also closes switch 30B to provide an address frequency $F_B$ for responding to the call from exchange B. As a result of receiving a call, a switch arm 28, which is normally connected to terminal 27, switches to terminal 29 for a predetermined period of time, resulting in the transmission of calling frequency $F_B$ via outgoing channel 16. When switch arm 28 reverts to its original position at terminal 27, a connection is thus made between the incoming jack 12A and outgoing channel 16.

Figure 3A:
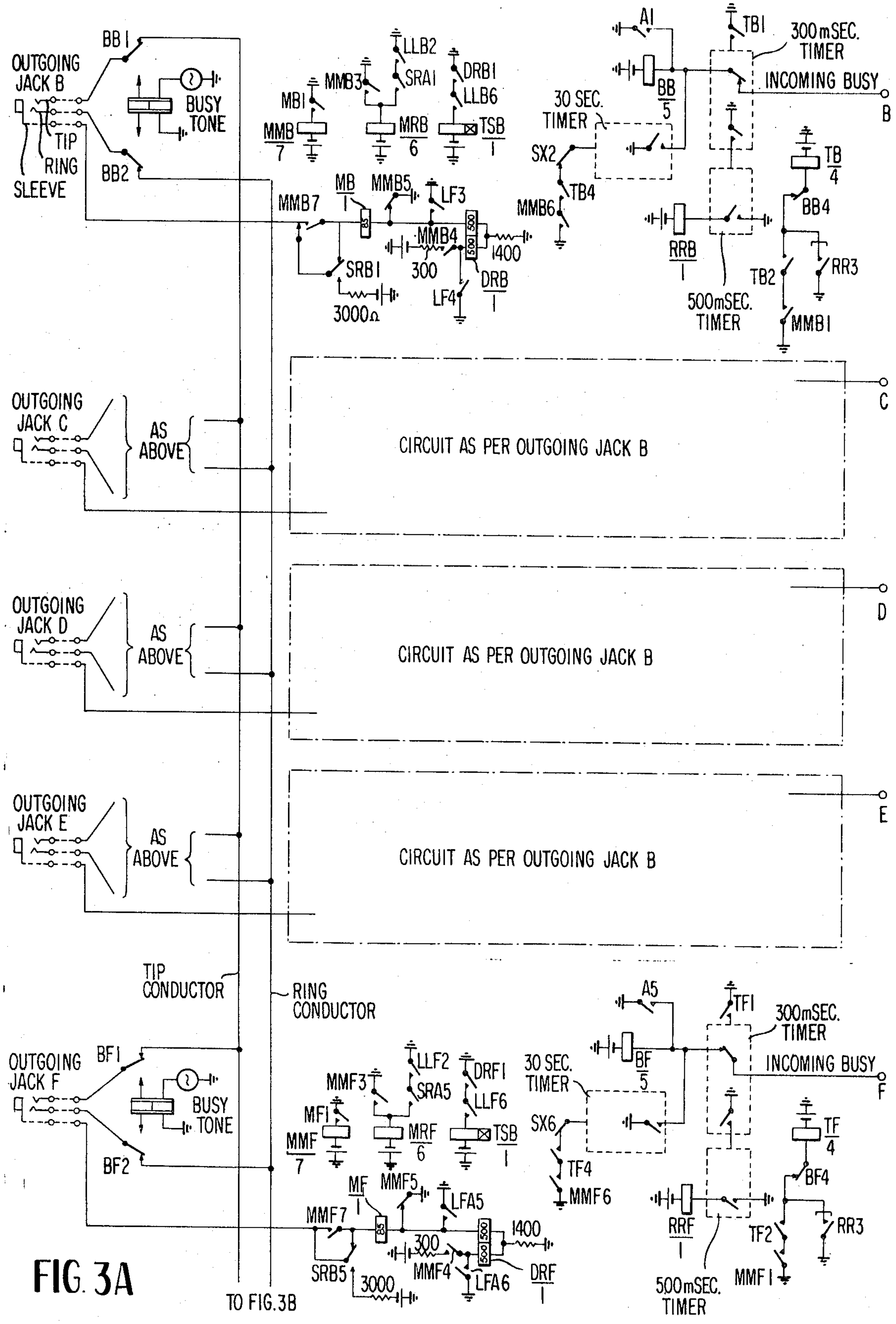
FIGS. 3*a*, 3*b* and 3*c*, taken together, are a detailed switching diagram of a preferred embodiment of the present invention.
Figure 3B:
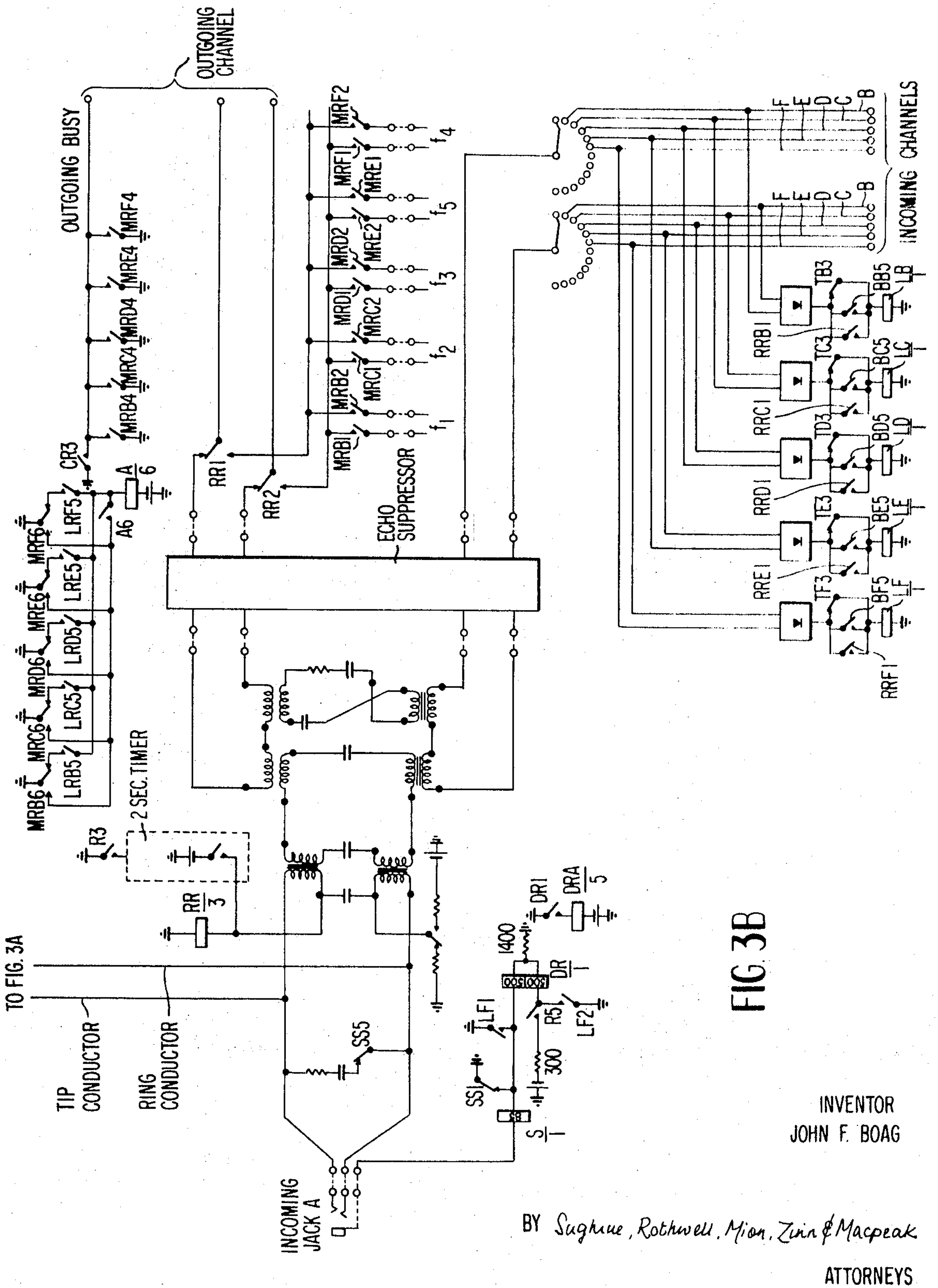
Figure 3C:
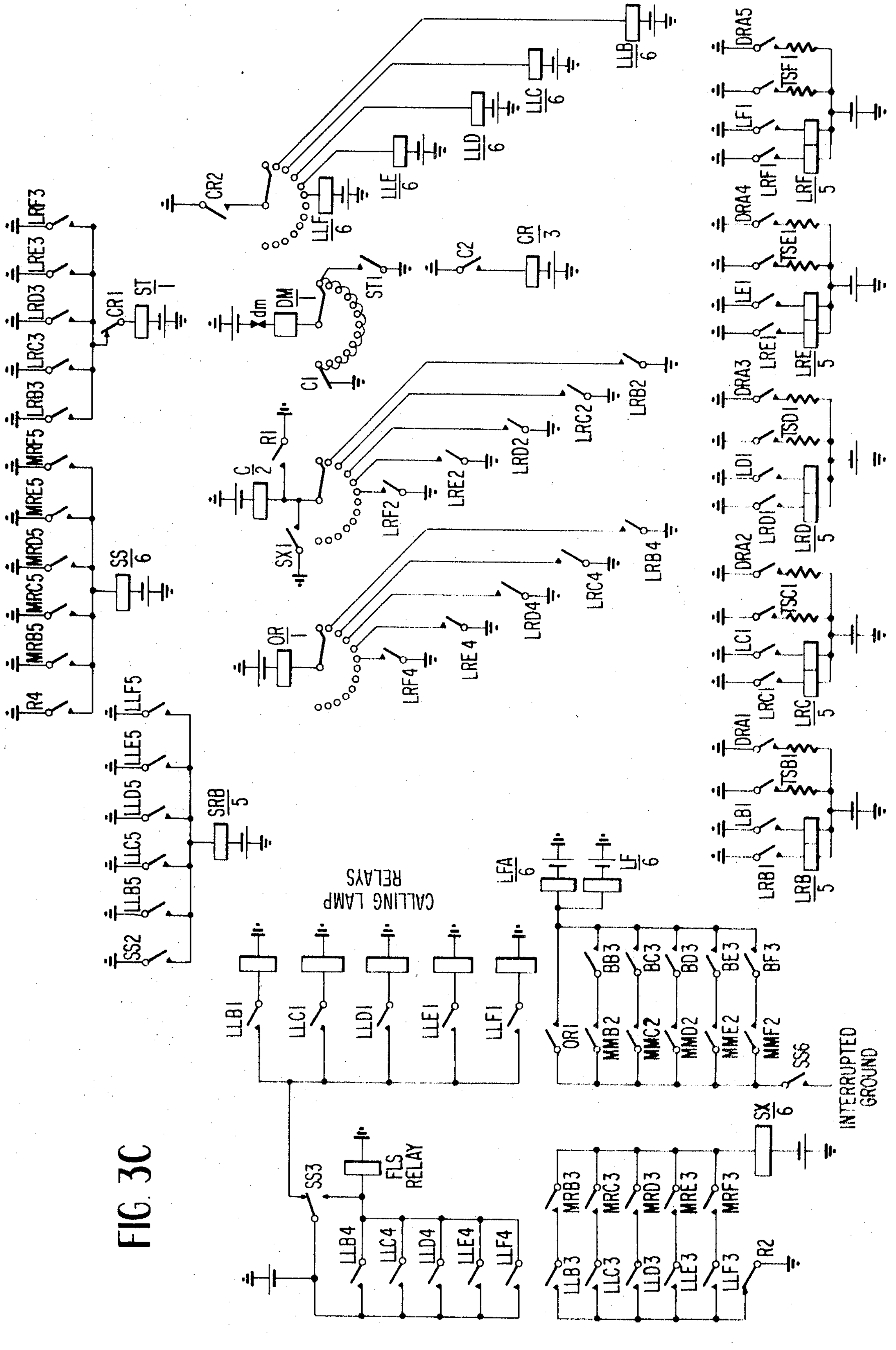

In the drawing of the detailed switching apparatus of a preferred embodiment of the present invention shown in FIG. 3, all switches are shown in the normal position when the corresponding relay is unenergized. All relays shown in the drawing, control the switches which have the same letter designation. The number under the letter designation for each relay indicates the number of switches controlled by that relay, and the number associated with the lettered designation for each switch indicates the switch number controlled by the corresponding relay. The exchange includes five outgoing jacks, B through F, and a single incoming jack A, each of which, as is well known, includes a tip, ring and sleeve which are electrically connected to the tip, ring and sleeve of the inserted plug of a standard cord circuit, illustrated in FIG. 4. The plug is inserted by the operator in one of the outgoing jacks in order to make a call and into the incoming jack in order to receive a call. A standard prior art cord circuit, for use with the present invention, is illustrated in FIG. 4. Since a cord circuit of this type is well known in the art, it will not be described in detail but will be referred to occasionally in connection with the detailed description of FIG. 3.

PROCEDURE FOR CALLING EXCHANGE B

The operator inserts the plug from the standard circuit into outgoing jack B. A battery 131 (FIG. 4) on the sleeve conductor 134 of the cord circuit operates relay MB (FIG. 3A)

| | | |
|---|---|---|
| MB | 1 | operates relay MMB/7. |
| MMB | 1 | prepares a hold circuit for timing relay TB/4. |
| MMB | 2 | prepares a hold circuit for relays LF and LFA. |
| MMB | 3 | operates relay MRB/6. |
| MMB | 4 | applies battery to one winding of relay DRB/1 in preparation of operator answering (relay DRB/1 operates whenever the current in the two windings are unbalanced). |
| MMB | 5 | disconnects full ground from relay MB/1 to darken the cord circuit supervisory lamp and also creating balance conditions to prevent operation of relay DRB/1. |
| MMB | 6 | prepares an operate circuit for a 30-second timer. |
| MMB | 7 | disconnects the "circuit busy" circuit from the sleeve circuit. |
| MRB | 1 | selects the calling frequency for exchange B |
| MRB | 2 | |
| MRB | 3 | prepares an operate circuit for relay SX. |
| MRB | 4 | applies a ground signal to operate the 3,825 Hz. transmitter to busy outgoing channel 16. |
| MRB | 5 | operates relay SS 6. |
| MRB | 6 | prevents operation of relay A/6 on operation of relay LRB/5. |
| SS | 1 | not effective at this stage. |
| SS | 2 | operates relay SRB/5. |
| SS | 3 | operates FLS relay. |
| SS | 4 | applies battery to ring conductor to give a permanent supervisory condition to other exchanges. |
| SS | 5 | disconnects terminating impedance. |
| SS | 6 | not effective at this stage. |
| SRB | 1 | |
| to | 5 | applies 3,000Ω resistor and battery to "busy" the sleeve conductors of the outgoing jacks except B, since the 3,000Ω resistor and battery in the outgoing jack B circuitry was bypassed by MMB 7. |

The operator now calls by operating the ring call key 133 in the standard cord circuit. The closed ring call key 133 connects a battery 135 to the tip conductor 130 which operates relay RR/3 (FIG. 3B).

| | | |
|---|---|---|
| RR | 1 & | applies signaling tone to line. |
| RR | 2 | |
| RR | 3 | operates relay TB/4. |
| TB | 1 | starts 300 ms. timing cycle. |
| TB | 2 | provides a hold circuit for relay TB via MMB 1. |
| TB | 3 | disconnects line relay LB from the line receiver. |
| TB | 4 | starts 30-second timing cycle. |

If a busy signal from exchange B is received within 300 ms. following the operation of the ring call key and the closure of switch TB 1, relay BB of the outgoing jack B busy sequence circuit will operate to provide a busying condition as follows:

| | | |
|---|---|---|
| BB | 1 & | applies busy signal to the tip and ring |
| BB | 2 | conductors. |
| BB | 3 | operates relays LF 6 and LFA 6. The only reason two relays are used is because a single relay normally controls a maximum of six switches. |
| BB | 4 | disconnects relay TB. |
| BB | 5 | connects relay LB/1 to the incoming line receiver. |
| LF | 3 | flashes the supervisory lamp |
| LF | 4 | of the cord circuit in the outgoing jack. Switches LF 3 and LF 4, which are in the sleeve circuit of outgoing jack B, operate to balance and thereby deenergize relay DRB/1 when closed. Also, when LF 3 is closed, the impedance to ground in the supervisory lamp circuit (standard cord circuit) is lowered thereby increasing the current through the supervisory lamp. Since the LF relay, when energized, is connected to an interrupted ground, the supervisory lamp will flash. |

As a result of the above-described sequence, assuming that exchange B is not busy, exchange A will have transmitted a calling frequency which addresses exchange B and a busy tone which notifies all other exchanges that exchange A is presently busy. At the end of 300 ms. which is assumed to be the one-way transmission time, now of the other exchanges will attempt to call exchange A. However, attempts may be made to call exchange B until such time as the busy signal from exchange B is received by the other stations. However, as will be pointed out in connection with the discussion of the called exchange, the latter attempts will be fruitless because after 300 ms. exchange B will have been seized and held by the call from exchange A. Upon receipt of the call by exchange A, exchange B operates to transmit an exchange A calling frequency and a busy tone. The exchange A calling frequency will arrive back at exchange A at about 800 ms. (assuming 600 ms. two-way transmission time plus 200 ms. switching time) following the initial transmission of the calling frequency from exchange A to exchange B.

During the latter transmission time, the following operation takes place at the calling exchange. The 300 ms. timer in the jack B busy sequence circuit operates at the end of the 300 ms. to disconnect busy relay 26B from the B busy line, and start the 500 ms. timer. At the end of a total of 800 ms., the 500 ms. timer closes a switch which energizes relay RRB/1. Switch RRB 1 connects detector relay RB to the incoming receiver via the calling frequency $F_A$, detector. If the operator speak key in the standard cord circuit is operated, relay DRB/1 in the exchange sleeve circuit will also be operated due to unbalanced conditions in the two windings resulting from switch SL placing an increased impedance on the sleeve circuit. Switch DRB closes to prepare an operate circuit for relay TSB/1. The received exchange A calling frequency appears on incoming channel B and operates relay LB/1.

| | | |
|---|---|---|
| LB | 1 | operates relay LRB. |
| LRB | 1 | provides a hold circuit for relay LRB/5. |
| LRB | 2 | provides a marking ground on the linefinder bank. |
| LRB | 3 | operates relay ST/1. |
| LRB | 4 | prepares an operator recall circuit. |
| LRB | 5 | not effective at this stage. |

Relay ST starts the drive circuit for the linefinder DM. The linefinder automatically drives until relay C operates to the marker ground provided by LRB 2. Since all of the stepping switches shown are controlled by the linefinder DM, in a manner well known in the art, and furthermore, since switch LRB is closed, the first step of a linefinder will result in the energization of relay C which in turn opens switch C 1 causing the linefinder to stop. The latter operation results in the input terminals of the two- to four-wire converter on the line side being connected to incoming channel B.

| | | |
|---|---|---|
| C | 1 | disconnects the linefinder drive circuit. |
| C | 2 | operates relay CR/3. |
| CR | 1 | disconnects relay ST to prevent further hunting. |
| CR | 2 | operates relay LLB/6. |
| CR | 3 | not effective at this stage. |
| LLB | 1 | not effective at this stage. |
| LLB | 2 | not effective at this stage. |
| LLB | 3 | operates relay SX/6. |
| LLB | 4 | not effective at this stage. |
| LLB | 5 | not effective at this stage. |
| LLB | 6 | completes operate circuit for relay TSB if operators' speak key is operated. |
| SX | 1 | provides a hold circuit for relay C/2—maintains prevention of further hunting. |
| SX | 5 | disconnects 30-second time circuit. |
| TSB | 1 | releases relay LRB/5. |

The circuit between the two exchanges is now established.

If a call had been received by exchange A on another incoming line prior to receipt of a return call from exchange B, the LR relay of the incoming line would have operated relay A/6. Contact A6 provides a hold circuit for relay A via the operated MR contact and contacts A1 through A4 operate relays BB/5 through BF/5.

If for any reason, e.g., simultaneous seizure, there is no response to the calling signal, relay BB will operate after 30 seconds to ground at SX 4 to cancel the outgoing call.

OPERATION AT THE CALLED STATION, ASSUMING EXCHANGE B CALLED EXCHANGE A

The exchange A calling frequency, transmitted by exchange B, will be received on incoming channel B and will operate detector relay LB/1 via normally closed switch TB 3. Also, the busy signal transmitted from exchange B will energize relay BB of the outgoing jack B busy sequence circuits.

| | | |
|---|---|---|
| LB | 1 | operates relay LRB/5. |
| BB & BB | 1 & 2 | applies busy tone to the outgoing jack. |
| BB | 3 | not effective at this stage. |
| BB | 4 | disconnects operate circuit for relay TB. |
| BB | 5 | provides a second operate circuit for relay LB. |
| LRB | 1 | provides a hold circuit for relay LRB. |
| LRB | 2 | provides a marking ground on the linefinder bank. |
| LRB | 3 | operates relay ST. |
| LRB | 4 | prepares an operator recall circuit via relay OR. |
| LRB | 5 | operates relay A (not effective at this stage. |

Relay ST/1 starts the drive circuit for the linefinder. The linefinder automatically drives until relay C/2 operates to the marker ground provided by LRB 2.

| | | |
|---|---|---|
| C | 1 | disconnects the linefinder drive circuit. |
| C | 2 | operates relay CR 3. |
| CR | 1 | disconnects relay ST/1 to prevent further hunting. |
| CR | 2 | operates relay LLB/6. |
| CR | 3 | applies ground to the outgoing busy lead. |
| LLB | 1 | operates calling lamp relay circuit. |
| LLB | 2 | prepares an operate circuit for relay MRB/6. |
| LLB | 3 | not effective at this stage. |
| LLB | 4 | operates FLS relay. |
| LLB | 5 | operates relay SRB/5 which applies a 3,000Ω resistor and busy battery to the sleeves of the outgoing jacks. |
| LLB | 6 | not effective at this stage. |

The operator answers the call from exchange B by inserting the plug into incoming jack A. Battery conditions on the sleeve of the cord circuit operate relay S/1.

| | | |
|---|---|---|
| S | 1 | operates relay R. |
| R | 1 | provides a holding circuit for relay C/2. |
| R | 2 | disconnects the operate circuit for relay SX/6. |
| R | 3 | operates relay RR/3 via a 2-second timer. |
| R | 4 | operates relay SS/6 which disconnects the calling lamp circuit. |
| R | 5 | applies a battery condition to one winding of relay DR/1 in preparation of operator answering. |
| R | 6 | operates relay SRA. |
| SS | 1 | disconnects full ground from answering sleeve circuit to darken supervisory lamp and maintain balance of currents in the DR/1 relay code. |
| SS | 2 | not effective at this stage. |
| SS | 3 | disconnects the calling lamp relay circuit and maintains the FLS relay circuit. |
| SS | 4 | applies battery to ring conductor to give a permanent supervisory condition to other exchanges. |
| SS | 5 | disconnects terminating impedance. |
| SS | 6 | connects flicker ground to relays LF/1 and LFA via OR 1. |
| SRA | 1 | operates relay MRB. |
| MRB & MRB | 1 & 2 | Selects the tone for returning the call to the calling exchange B. |
| MRB | 3 | not effective at this stage. |
| MRB | 4 | not effective at this stage. |
| MRB | 5 | not effective at this stage. |

Operation of relay RR for 2 seconds sends a 2-second burst of calling signal on the outgoing channel to exchange B. Contact RR 3 is not effective at this stage.

When the operator operates the speak key in the standard cord circuit the sleeve circuit is unbalanced and relay DR operates. DR 1 operates relay DRA/5.

| | | |
|---|---|---|
| DRA | 1 | releases relay LRB/5. |
| LRB | 4 | releases relay OR/1. |
| OR | 1 | releases LF and LFA to cease the flashing of the supervisory lamp. |

OPERATOR RECALL

Should an operator require to recall the distant operator, the near end operator momentarily operates the ring key to operate relay RR which in turn causes a signal to be sent to the distant exchange to operate the line relay. The LR 4 contact will operate relay OR. OR 1 will complete a circuit for relays LF and LFA.

The LF or LFA contacts will flash the supervisory lamp by applying full ground to the sleeve conductor, and at the same time, apply ground to the second coil of the DR relay to maintain balance in the two coils.

The operator on seeing the supervisory lamp flashing will operate the speak key. This will increase the resistance of the sleeve conductor and relay DR will operate on the first release of contact LF or LFA. DR on operating will release the line relay either directly if the answer jack is being used, or via TS if a calling jack is being used.

CLEARING

When the call is completed, the operators will remove the cord circuits from either end of the circuit. Relays M and S will release, causing all other operated relays to release in turn.

CIRCUIT ARRANGEMENTS TO PREVENT DUAL SEIZURE

The circuitry of the exchanges of the present invention are capable of preventing dual seizure from occurring. There are two general cases to be considered:

Case 1: two exchanges attempting to call one another within 300 ms.

Case 2: two exchanges attempting to call a third station within 600 ms.

a. Case 1

Whenever a channel is seized or answered, a busy signal is transmitted (out-of-band signaling channel). This signal is received by all exchanges after a delay of 300 ms. On receipt of the busy signal, the appropriate outgoing jacks at each exchange in the pool are busied.

Consider the case of exchange A attempting to call exchange B at time $t_o$ and exchange B attempting to call exchange A at time $t_o$+100 ms. On seizing an outgoing channel the following steps are made:

1. The calling frequency of the wanted exchange is transmitted.
2. The busy signal is transmitted.
3. The relay connected to the receiver corresponding to the called exchange is disconnected.
4. A 300 ms. timing circuit controlling the operation of the relay connected to the incoming busy circuit of the called exchange is started.

Thus, at time $t_o$+100 ms., the only difference in the circuit conditions at exchanges A and B is that the timer at exchange A has been running for 100 ms. while that at B has just started. At time $t_o$+300 ms. the timer at A operates to disconnect the operate circuit for relay BB, thus making the busy signal received from B ineffective. Relay BB, in not operating means that the incoming calling relay LB is not connected to its receiver. Thus, B's calling signal is ineffective. At time ($t_o$+300 ms.) the timer at exchange B has still 100 ms. to run before operating, hence relay BA operates to A's busy signal. The timer stops timing and the LA detector relay is connected to the A incoming channel to operate to the incoming signal from A. Relay BA also busies the outgoing circuit to exchange A as far as exchange B is concerned, and cuts off B+s calling signal.

At exchange A when the 300 ms. timer operates it causes a second timer to start a 500 ms. timing sequence. At the end of this sequence relay RRB operates to reconnect the calling relay LB to its receiver in readiness for the return connecting signal from B. Note the period of 500 ms. has been chosen so as to ensure that B's calling signal has ceased before connecting relay LB to its receiver.

The return signal from exchange B will not be received at exchange A until such time as the outgoing operator at exchange B clears down the outgoing call and the incoming operator answers A's call by plugging into the answering jack.

b. Case 2

Consider now the case of exchange B calling exchange A at time $t_o$ and exchange F calling exchange A at time $t_o$+100 ms. The seizing conditions as outlined in case 1 will apply at exchanges B and F. At $t_o$+300 ms. relay LB in exchange A will operate to start the linefinder hunting for the calling lines. (If a second calling signal is received before the linefinder locates the first calling line, it is possible for the linefinder to find the second calling line first. If this happens, the first calling line will get no response and will be forced released in 30 seconds.) When the linefinder finds the first calline, i.e., exchange B, exchange A immediately sends out a busy signal which is received by all exchanges 300 ms. later. This signal will not, however, be received by exchanges B and F since the timers will have operated at each exchange disconnecting the busy relays. However, if a response to the calling signal is not received within 30 seconds, the busy relay at exchange F will operate to release the call.

If another exchange should call either exchange B or F within 300 ms. of exchanges B or F making their attempt to call exchange A, the A relay at exchanges B and F will operate to busy the respective outgoing circuits. When the outgoing circuits are released, the calling lamp at the wanted exchange will light indicating the calling exchange as in case 1.

PREVENTION OF SEIZURE PRIOR TO RETURN CALL

As pointed out above, when exchange A calls exchange B, for the first 300 ms. (approximately the one-way transmission time) following the call a call from exchange B interrupts the call to exchange B. For the next 500 ms., a call from exchange B is not accepted. Thus, when A and B are substantially simultaneously trying to call each other, the call initiated first in time will take precedence. Also, as explained above when two stations call a third station, the call first in time will take precedence. However, in the circuitry shown in FIG. 3, a call from a third station to station A will take precedence, provided it arrives at station A prior to the time a return signal is received from station B. This is true even though the call from the third stations was initiated subsequent to the call from station A to station B. For example, assume station A calls station B at time $t_o$ and station F calls station A at time $t_o$+200 ms. At time $t_o$+500 ms. the call from station F will be received by station A causing the station A hunting circuitry to lock onto incoming channel F. The return call from station B will arrive at station A at time $t_o$+800 ms. but will not be accepted by station A because the hunting circuitry has already locked on incoming channel F. At time $t_o$+30 seconds, the 30-second timer will initiate busying relay BB since a response from station B was not received. The call from station F can then be answered by the operator removing the plug from outgoing jack B and inserting the plug in incoming jack A. Thus, the call from F takes precedence over the call from A even though the call A occurred first in time. In order to prevent the latter situation from occurring, means, not illustrated, may be provided for disabling all of the detector relays, LB through LF for the 500 ms. period following the operation of the 300 ms. timer.

While the invention has been particularly shown and described with reference to preferred embodiments thereof, it will be understood by those skilled in the art that various changes in form and details may be made therein without departing from the spirit and scope of the invention.

What is claimed is:

1. An exchange for providing a communication path between a local communication path on the local side of said exchange and one of N possible remote similar exchanges on the line side of said exchange on a demand basis, said local path being adapted to be connected to said exchange by means of a plug-in cord circuit, said exchange comprising:

a. a two-wire to four-wire terminating set having a common input/output connection on the local side of said exchange and separate input and output connections on the line side of said exchange,
b. N outgoing jacks adapted to receive said plug for calling said N remote exchanges respectively,
c. an incoming jack adapted to receive said plug for answering a call from any of said remote exchanges, all of said incoming and outgoing jacks being normally connected to said input/output connection of said terminating set,
d. N input channels on the line side of said exchange for receiving communications from said N remote exchanges respectively,
e. an outgoing channel on the line side of said exchange for sending signaling and voice communication to all of said N remote exchanges,
f. N tone generator means for generating tones corresponding to address frequencies of said N remote exchanges respectively,
g. N busy circuits, one associated with each of said outgoing jacks and each being operative when energized by a busy signal to provide a busy tone at the associated outgoing jack and to disconnect said associated outgoing jack from said input/output connection,
h. means responsive to the insertion of said plug into one of said outgoing jacks connected to said input/output connection for selecting one of said address frequencies to be transmitted over said outgoing channel, said selected address frequency being the address of the exchange called by said outgoing jack, and for transmitting a busy signal to said remote exchanges, said busy signal being a frequency outside of the voice band,
i. means associated with each busy circuit responsive to busy signals received from said remote exchanges for energizing the corresponding busy circuit,
j. means for connecting said selected frequency to said outgoing channel and for disabling said last-mentioned means for energizing at a first predetermined time thereafter,
k. N address detector means for detecting the exchange address frequency on said N input channels, respectively,
l. means responsive to the detection of said exchange address by one of said detector means for connecting the incoming channel associated with said one detector means to the input connection of said terminating set.

2. An exchange as claimed in claim 1 further comprising means for disabling the detector means associated with the incoming channel for the called exchange for a second predetermined time following said first predetermined time.

3. An exchange according to claim 2 further comprising:

a. means responsive to the detection of said exchange address by one of said detector means for providing an indication of the incoming channel carrying said exchange address, and
b. means responsive to said plug being inserted into said incoming jack following detection by one of said detector means for connecting the address frequency corresponding to the calling station to said output channel for a predetermined period of time and for transmitting said busy signal to said remote locations.

4. An exchange according to claim 3 further comprising means for energizing said busy circuit a predetermined time following the initiation of call in the absence of a response from the called exchange or a call from another of said remote exchangers.

5. An exchange according to claim 4 further comprising means responsive to the connection of said input connection to one of said incoming channels for holding said connection until the call is terminated.

6. An exchange for providing a communication path between a local communication path on the local side of said exchange and a remote exchange on the line side of said exchange comprising:

a. means for calling said remote exchange comprising,
   i. means for transmitting a tone which uniquely identifies said remote exchange over a channel which uniquely identifies said local exchange,
b. means for accepting a response from said remote location comprising,
   i. means for detecting a tone frequency, which uniquely identifies said local exchange, over a channel which uniquely identifies said remote exchange, and
   ii. means responsive to the detection of said tone frequency by said latter means for applying communications received over said channel to said local side of said exchange,
c. means for transmitting a busy-indicating frequency which is outside of the voice band for the duration of said call, and
d. means responsive to the receipt of said busy frequency from said remote exchange prior to a first predetermined time following the calling of said remote exchange for terminating the call to said remote exchange.

7. An exchange as claimed in claim 6 further comprising means for disabling said detecting means for a second predetermined time following said first predetermined time.

8. An exchange as claimed in claim 7 further comprising second detector means for detecting said tone frequency uniquely identifying said local exchange over a channel which identifies another remote exchange, and means responsive to the detection of said tone frequency by said second detection means for disabling said means for accepting a response.

9. An exchange as claimed in claim 8 further comprising means for disabling said second detector means at the end of said first predetermined time.

10. An exchange for providing communicating paths with other exchanges on a demand basis comprising means for receiving busy signals from said other exchanges when said other exchanges are transmitting and means connected to said busy-signal-receiving means for stopping an attempted call to one of said other exchanges in response to a busy signal from said other exchange being received when said call is initiated or at any time during a first predetermined time after said call is initiated.

11. An exchange as claimed in claim 10 further comprising:

a. call selector means for initiating a call to a selected exchange,
b. busy signal generator means for generating a busy signal frequency outside of the voice band,
c. a plurality of address tone generators, each generating a tone which is associated with one of said remote exchanges, and
d. means responsive to the initiation of a call by said call selector means for transmitting said busy signal frequency and said address tone corresponding to said selected remote exchange.

12. An exchange as claimed in claim 11 further comprising means for stopping said call if no answer is received for a second predetermined amount of time following the initiation of said call.

* * * * *